(12) United States Patent
Harris et al.

(10) Patent No.: US 6,174,947 B1
(45) Date of Patent: Jan. 16, 2001

(54) LOW VOLATILE ORGANIC COMPONENT POLYURETHANE VARNISH

(75) Inventors: Robert R. Harris, McHenry; Andrea L. Bander, Bolingbrook, both of IL (US)

(73) Assignee: McWhorter Technologies, Carpentersville, IL (US)

( * ) Notice: Under 35 U.S.C. 154(b), the term of this patent shall be extended for 0 days.

(21) Appl. No.: 09/123,105

(22) Filed: Jul. 27, 1998

(51) Int. Cl.[7] .................................................. C08L 5/11
(52) U.S. Cl. ........................................ 524/313; 524/197
(58) Field of Search ...................................... 524/313, 197

(56) References Cited

U.S. PATENT DOCUMENTS

| | | | |
|---|---|---|---|
| 3,942,997 | 3/1976 | Go et al. | 106/285 |
| 3,998,979 | 12/1976 | Armstrong et al. | 427/54 |
| 4,056,495 | 11/1977 | Kawamura et al. | 260/22 |
| 4,104,215 | 8/1978 | Aimono et al. | 260/22 CB |
| 4,184,031 | 1/1980 | Graham et al. | 528/55 |
| 4,403,073 | 9/1983 | Ikeguchi | 525/374 |
| 4,603,188 | 7/1986 | Kusakawa et al. | 528/60 |
| 4,666,524 | 5/1987 | Smith | 106/264 |
| 4,721,754 | 1/1988 | Baghdadchi | 525/194 |
| 5,077,349 | 12/1991 | Fehlbier et al. | 524/705 |
| 5,378,761 | 1/1995 | St. Clair | 525/111 |
| 5,441,771 | 8/1995 | Seltmann et al. | 427/386 |

*Primary Examiner*—Peter D. Mulcahy
(74) *Attorney, Agent, or Firm*—Fitch, Even, Tabin & Flannery

(57) ABSTRACT

The inventors provide herein polymeric vehicles effective for depositing a coating composition that is curable upon exposure to the atmosphere and which has a low content of a volatile organic component, a high content of nonvolatile materials, a low viscosity, and a short drying time determined under common atmospheric conditions. The polymeric vehicle of the invention contains a polyurethane obtained by combining a polyisocyanate and a polyol having pendant hydroxyl groups, a polyunsaturated resin, oil, and a drier component. The inventors also provide the coating compositions themselves. The compositions have sufficiently low viscosities as to be readily applied to a surface, and which dry to hardness in less than 4.5 hrs. The inventors further provide protective varnish coatings, formed on a surface, which require protection from exposure to the atmosphere and which are obtained from a polymeric vehicle composition after having been applied to the surface, as a result of being cured upon exposure to the atmosphere. The coatings of the invention have smooth finishes, and resist physical wear by having a high degree of hardness while retaining flexibility and low brittleness. In addition the coatings retain clarity over an extended aging period.

The inventors further provide methods of protecting surfaces by applying the curable coating compositions of the invention to the surface and permitting the composition to cure upon exposure to the atmosphere. The surface is thereby protected from exposure to the elements.

The inventors additionally provide methods of preparing the curable coating composition of the invention wherein the components of the coating compositions of the invention are combined together.

25 Claims, 2 Drawing Sheets

LOW VOLATILE ORGANIC COMPONENT POLYURETHANE VARNISH

The present invention relates to polymeric vehicles and curable coating compositions for application on surfaces. In particular this invention provides a solution to the problem of preparing such polymeric vehicles and coating compositions having a low content of volatile organic components. The resulting coatings are varnishes having excellent properties of hardness, flexibility and clarity.

BACKGROUND OF THE INVENTION

Finishes for various surfaces have been practiced widely in the field. They are based on a wide range resins, and intended for application on different surfaces.

Liquid polymers based on copolymerizing 1,3-pentadiene and 1,3-butadiene in the presence of a Friedel-Crafts catalyst were used to prepare coatings or coatings with the aid of curing agents which may be peroxides or a metal agent such as cobalt naphthenate and lead naphthenate (U.S. Pat. No. 3,942,997). The coatings are usable as paint compositions.

Curing, or crosslinking, of polymers such as oil-modified alkyd resins in the presence of oxygen is accelerated by photosensitizers such as benzil, 1-naphthil and similar compounds (U.S. Pat. No. 3,998,979). The photosensitizers replace the use of metallic driers such as cobalt naphthenate or lead naphthenate. The unsaturated oil-modified alkyd resins have incorporated into their structure moieties derived from oils such as linseed oil, tung oil, and other oils. These compositions cure in the presence of sunlight as a consequence of the incorporation of the photosensitizers. Examples provide full gloss white paints based on soya bean oil alkyd, phthalic anhydride, and pentaerythritol, using a solvent of white spirit.

A solvent-free resinous composition was developed that produces little odor or is odor free (U.S. Pat. No. 4,104,215). The composition is a varnish disclosed as having excellent electrical and mechanical properties in shaped articles. It is obtained by reacting a glycidyl ester of a fatty acid with acrylic acid or methacrylic acid at high temperatures, and combining with an acrylic-modified polybutadiene, or an unsaturated polyester resin. Curing agents such as peroxides, and accelerators such as conventional metal naphthenates or octoates optionally used in low proportions are also disclosed.

A curable resin composition disclosed in U.S. Pat. No. 4,403,073 is based on combining a polyfunctional cyanate bearing compound with a polymeric material chosen from polybutadiene, or reaction products of polybutadiene and compound selected from the group consisting of isocyanates, acrylates and unsaturated acid anhydrides, among others. The resulting cured resin is disclosed as having heat resistance, flexural property, elasticity, adhesive force, resistance to impact, chemicals and the like. Uses for this composition include a coating for rust prevention, flame resistance and retardation, electrical insulating material, and as an adhesive.

A solventless curable urethane composition for casting compounds and encapsulating compounds for electric devices such as printed circuit boards is disclosed in U.S. Pat. No. 4,603,188. The composition is based on a polyhydroxyl component, such as an oil which can be castor oil, combined with a polybutadiene based polyol, and a polyisocyanate component. The composition can be cured at room temperature or with heating.

Sealants, coatings and binders based on polyurethanes and/or polyureas are disclosed in U.S. Pat. No. 4,721,754. A polybutadiene having terminal hydroxy groups, and/or a polybutadiene having terminal alkylamino groups, when reacted with polyisocyanates yield the corresponding products. Several diisocyanates and higher polyisocyanates are disclosed as being usable in the resin-forming composition. Optional catalysts include titanium catalysts and stannous octanoate. Elastomer sheets were formed using these compositions.

Compositions for coating concrete or steel surfaces are disclosed in U.S. Pat. No. 5,077,349. Polyisocyanates are reacted with a polyol which is a polybutadiene polyol in compositions containing in addition alkaline earth metal oxides or hydroxides. The latter may be supplied by using Portland cement or blast furnace cement. An example reports a composition that was applied to a concrete surface with a trowel.

Corrosion-resistant coatings for surfaces such as steel or plastic based on mono-substituted hydroxyl polybutadienes combined with an isocyanate curing agent are disclosed in U.S. Pat. No. 5,378,761. The monohydroxylated polybutadienes are synthesized with a living polymer reaction using lithium initiators. These are first reacted with isocyanate curing agents, and then the modified resin bearing an isocyanate capping group is blended with epoxy or acrylic resin. This blend is applied to a metal or plastic substrate, and cured for periods of time such as 1 week.

These various compositions and methods fail to address the need for a clear varnish coating for surfaces such as wood, concrete and plastic. They fail to consider the need for polyurethane-forming varnish compositions that minimize the content of volatile organic components, that provide rapid drying and curing times, and that are hard, flexible and not susceptible to loss of clarity.

SUMMARY OF THE INVENTION

An objective with polymeric vehicles and coating compositions used as varnishes on various surfaces is reduction of the content of volatile organic components. This objective is motivated by the recognition that, in the past and potentially in the future, petrochemical shortages militate against the use of organic solvent in great volumes. It is also motivated by the desire to reduce exposure of workers involved in manufacturing the compositions, and of the persons applying the resin composition and of those in the vicinity of the surface being treated, to the potentially harmful effects from the vapors of the volatile organic components (VOCs), and their unpleasant odor. This goal is further motivated by the desire to reduce adding solute vapors to the atmosphere which may contribute to air pollution such as photochemical smog, and which contain or are precursors for greenhouse substances that may contribute to warming of the Earth's atmosphere. Governments have promulgated regulations setting forth guidelines relating to VOCs which may be released to the atmosphere. The U.S. Environmental Protection Agency (EPA) has established guidelines limiting the amount of VOCs released to the atmosphere, which have been adopted or are under consideration for adoption by the various states of the United States. Thus, guidelines such as these are of particular concern to the paint and industrial coating industry which uses organic solvents that volatilize into the atmosphere.

There are several potential difficulties attendant upon reducing the content of volatile organic components in a varnish resin composition. One problem is that the composition may develop a skin at the liquid-air interface upon storage. Such a skin must be removed, for if not, and subsequently blended into the composition, it may be inadvertently applied to the surface with the liquid varnish composition leading to inhomogeneity of the applied finish. An additional concern is that unless a large amount of a volatile organic solvent is added as a thinner, the viscosity of the composition may become too high to allow for ease of application of the varnish on the surface. This relates to application methods such as those using brushes, rollers, or sprayers, for example. In addition, the curing of the resin composition may be adversely affected, leading to coatings that are not hard enough, or that do not retain a smooth surface. Furthermore, the drying time may be inappropriately short or long for the development of coatings with desired properties of hardness and gloss. An additional difficulty may be that the flexibility versus the brittleness of the varnish coating may not have desirable attributes. A still further difficulty arises from the potential for loss of clarity and discoloration of the varnish coating upon aging. In order to achieve the objective of reducing the volatile organic component in a resin composition, these difficulties must be overcome.

Thus the present invention is directed to polymer varnish vehicles and curable coating compositions having as their primary objective the reduction therein of the content of VOCs. The invention succeeds in preserving the viscosity at the time of application sufficiently low so as to maintain ease of application of the vehicle. In addition the formation of a skin at the vehicle-air interface on storage has been minimized. The invention furthermore discloses a coating composition that cures to dryness in an acceptably short period of time. The invention also provides a coating composition that cures to a coating which retains flexibility to sustain physical stress, a coating that is hard enough to provide protection to the surface and a coating that minimizes development of opacity and color.

The inventors provide herein polymeric vehicles effective for depositing a coating composition that is curable upon exposure to the atmosphere. The polymeric vehicles have a low content of a volatile organic component, a high content of nonvolatile materials, a low viscosity, and a short drying time determined under common atmospheric conditions. The vehicle of the invention contains a polyurethane obtained by combining a polyisocyanate and a polyol having pendant hydroxyl groups, a polyunsaturated resin, an unsaturated vegetable oil, and a drier component.

The inventors also provide coating compositions curable upon exposure to the atmosphere which have a low content of a volatile organic component, containing a polyurethane obtained by combining a polyisocyanate and a polyol having pendant hydroxyl groups, a polyunsaturated resin, an unsaturated vegetable oil, and a drier component, and optionally containing an inert organic solvent. The compositions have contents of volatile organic components of less than about 400 g/l, and in an important aspect, the content is in the range of about 340 g/l to about 360 g/l at the time of application to a surface. The inventors provide compositions having sufficiently low viscosities as to be readily applied to a surface, and which dry to hardness in less than about 4.5 hrs.

A further important aspect of the invention relates to the protective varnish coating formed on a surface requiring protection from exposure to the atmosphere which is obtained from a polymeric vehicle composition after having been applied to the surface, as a result of being cured upon exposure to the atmosphere. The polymeric vehicle composition contains a low content of a volatile organic component, and further is composed of a polyurethane obtained by combining a polyisocyanate and a polyol having pendant hydroxyl groups, a polyunsaturated resin, an unsaturated vegetable oil, and a drier component. It is unexpectedly found that the coatings of the invention have uniform finishes, and resist physical wear by having a high degree of hardness while retaining flexibility and low brittleness. In addition the coatings retain clarity over an extended aging period.

The inventors have further developed a method of protecting surfaces in need of protection from the atmosphere by applying the curable coating compositions of the invention to the surface and permitting the composition to cure upon exposure to air. The surface is thereby protected from exposure to the elements by virtue of the cure of the finish, and the fact that it retains a high degree of hardness while maintaining flexibility and low brittleness.

An additional important aspect of the invention relates to a method of preparing the curable coating composition of the invention wherein a polyisocyanate is contacted with a polyol contained in a first composition that further includes a base oil, under conditions that produce a polyurethane therefrom. The resulting first composition is combined with a second composition which comprises a polyunsaturated resin in a blending oil. In addition, either the first composition or the second composition, or both, may also include a drier and additional inert solvent.

DETAILED DESCRIPTION OF THE INVENTION

Figure 1:
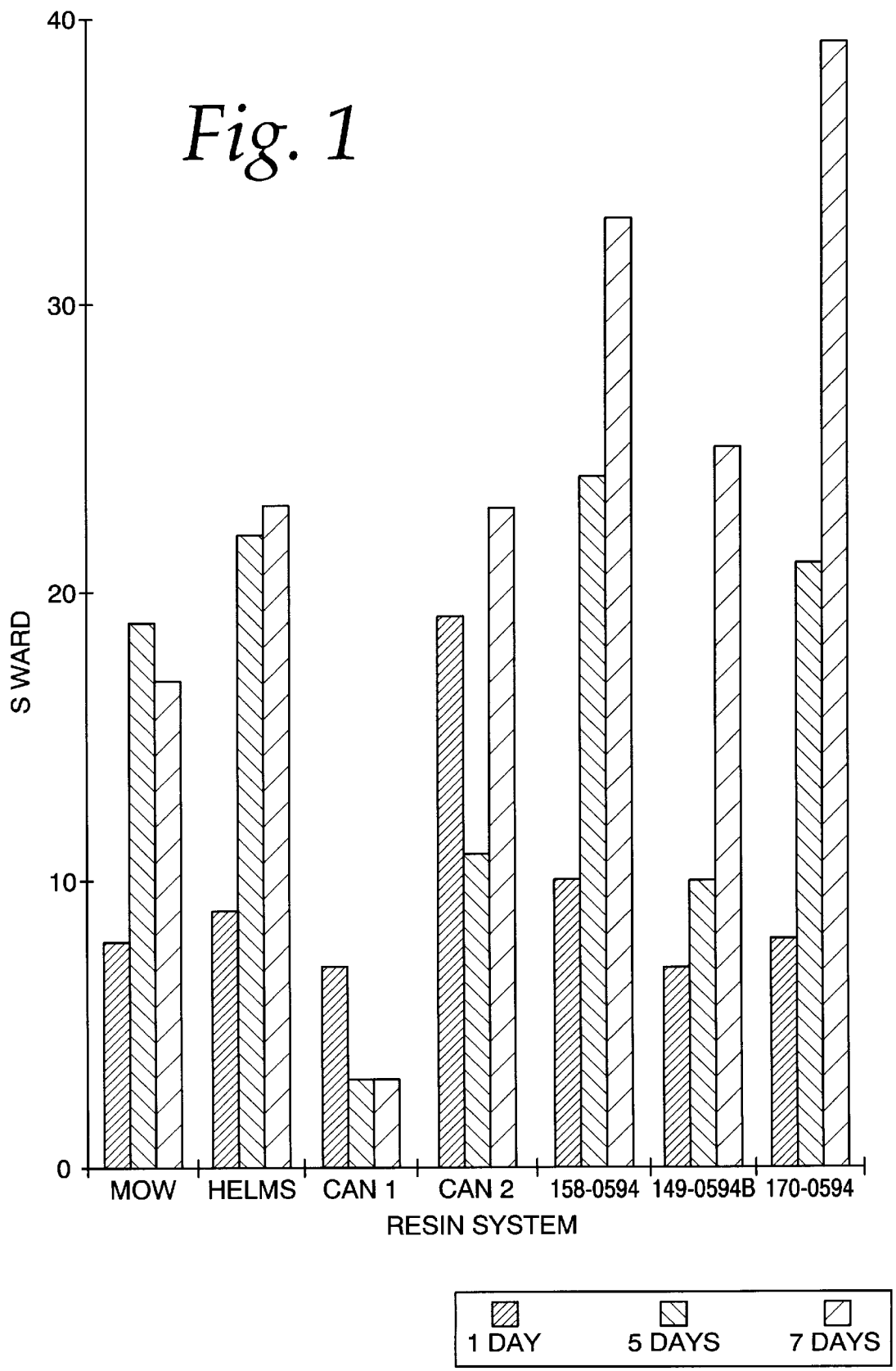
FIG. 1 presents Sward Hardness determinations for four commercial varnish coatings and three coatings of the present invention.

As used herein, "polymeric vehicle", or "polymeric varnish vehicle" relates to all polymeric, resinous and polymerizable components present in the compositions of the invention. Without intending to limit the composition of the polymeric vehicle, it may additionally include crosslinking agents, driers and catalysts, and may contain further additives.

As used herein "coating composition" or "curable coating composition" relates to the final composition which is applied to a surface. In general it includes all components present prior to application of a coating. It contains all the components present in the polymeric vehicle, and may optionally further include components such as an inert organic solvent.

As used herein, the term "volatile organic components" (VOCs) relates to those components in the polymeric vehicle and the coating composition which have a high enough vapor pressure that they evaporate within the time interval required for curing of the coating composition to occur. VOCs include inert organic solvents, i.e., liquids which are based on hydrocarbon or other organic carbon-containing solvents used to dissolve or to suspend the solid and nonvolatile components present in the polymeric vehicles and the coating compositions of the invention. Commonly used solvents that are encompassed within the term volatile organic components include mineral spirits, for example KWIK Dri™ (Ashland Chemicals). VOCs may also include such volatile components of the polymeric vehicle that are involved in coating formation; these substances may include, for example, crosslinking agents having a high vapor pressure. The proportion of VOCs present in the polymeric vehicles of the invention are determined by methods well known to those skilled in the arts of industrial finishes, and include determining weight loss on drying.

As used herein, "low content of volatile organic component(s)", or phrases with similar wording, relate to contents of VOCs less than about 400 g/l, but greater than zero.

As used herein, "nonvolatile materials" (NVMs) relates to components in the polymeric vehicle and the coating composition as prepared, i. e., prior to curing, which are not encompassed within the designation VOCs. NVMs thus include, without intending to limit the components which fall into this category, the polyol, polyunsaturated resin, the polyurethane obtained by combining a polyisocyanate and a polyol, the unsaturated vegetable oil, driers and catalysts, and may further include other additives.

As used herein, the term "coating" relates to the result obtained upon curing the coating composition after it has been applied to a surface. Without wishing to be bound or limited by theory, it is believed that curing importantly involves the formation of carbon-carbon crosslinks between the individual polymer molecules, between the molecules of the oil, and between the molecules of oil and the polymer molecules, by reaction between their various double bonds. Curing also involves evaporation of VOCs leaving behind only NVMs. In general, the coating includes products derived from the components of the polymeric vehicle of the invention.

As used herein, "drying" of a coating composition after it has been applied to a surface is described by dry time stages. These may be determined using a drying time recorder in which a pointed stylus moves across the coating during drying, and are categorized as follows:

First Stage—Leveling: The coating partially flows back together after the stylus moves through it. This is the time for evaporation of solvent.

Second Stage—Base Trace: The coating is starting to set up. It does not completely flow back together after the stylus moves through it. This corresponds to a sol-gel transition.

Third Stage—Ripped Coating: The stylus rips the coating. The coating is starting to surface dry, but not through dry.

Fourth Stage—Surface Trace: The stylus leaves a slight mark on the surface of the coating. The coating is starting to through dry. If a very, very slight stylus mark is in the coating, this will be considered a mar.

Fifth Stage—Dry: The stylus leaves no mark. This corresponds to through dry.

Dry time stages may be measured in a straight line recorder or in a circular drying time recorder, such as those manufactured by BYK-Gardner (Silver Spring, Md.). Drying involves both evaporation of VOCs and curing of the coating.

Additional standards for assessing various stages of drying times are contained in ASTM Designation D 1640. As used herein, the term "set-to-touch" relates to the test described therein under section 7.2. As used herein, the term "dry hard" relates to the time required for the coating composition, once applied on a surface, to dry to hardness, as described in ASTM D 1640, section 7.6.

As used herein, the term "viscosity" relates to the resistance of a fluid to undergo flow, be it Newtonian flow or non-Newtonian flow. In the present invention viscosity is measured according to either ASTM Designation D 803 using Gardner Holdt bubble tubes, or ASTM Designation D 1200 using a #4 Ford Cup. Viscosity determinations are presented herein using the Gardner-Holdt scale (ASTM Designation D 1545), whose values are assigned letters ranging from A3 for a viscosity of approximately 0.14 stoke through Z10 for a viscosity of approximately 1000 stokes. The letter symbol can further include a plus sign "+" or a minus sign "−", which refer to slightly thicker, or slightly thinned, compositions, respectively.

As used herein, the terms "flexibility" and "brittleness" relate to the extent to which the cured coating can resist, or is ruptured by, deformation. It is measured using a ⅛" conical mandrel in an apparatus available, for example, from BYK-Gardner according to ASTM Designation D 522.

As used herein the term "hardness" relates to the plastic flow stress of a material, such as a film. Hardness may be measured in an apparatus such as the Sward Rocker Hardness Tester (Erichsen, Germany, or Sheen Ltd., England) according to ASTM Designation D 2134. Results are reported on the Sward Hardness scale. This scale has values ranging from 2 to more than 70 in units of seconds.

As used herein, the terms "yellowing, color change and yellowing index" relate to the visual appearance of an applied varnish coating, and especially to changes in these attributes upon aging. Color and color change is assessed on a scale of lightness versus darkness, and is given a value L, whereas yellowing is assessed on a scale grading from yellow to blue, and is given a value b. The yellowing index (Y.I.) combines these values according to the formula Y.I.= 142.9 b/L. Higher values of Y.I. indicate poorer clarity and/or color attributes.

As used herein, the term "polyol" relates to an organic compound having two or more pendant hydroxyl groups each of which is available for reaction with a reactive group such as an isocyanate group, especially an isocyanate group on a polyisocyanate. An important class of polyols is made up of low molecular weight polyols. In an additional important embodiment of the invention, a polyol may be polybutadiene derivatized by having end caps of hydroxyl groups. An end-capped linear polybutadiene, by this description, will be a diol, having a pendant hydroxyl group at each of the two ends.

As used herein, the term "polyisocyanate" relates to an organic compound having two or more isocyanate groups each of which is available for reaction with a reactive group, such as a hydroxyl group, especially a hydroxyl group on a polyol. An important class of polyisocyanates in the present invention includes diisocyanates.

As used herein, the term "unsaturated vegetable oil" relates to an oil derived from vegetable sources which is a liquid under usual operating temperatures, and whose fatty acid moieties contain a significant proportion of ethylenic double bonds.

As used herein, the term "drier" relates to an additive in the polymeric vehicle which accelerates the drying time of the composition after it has been applied to a surface. Without wishing to be bound by theory, it is believed that a drier catalyzes curing of a coating composition, such as formation of crosslinks induced by the action of oxygen from the air. It is further possible that a drier serves as a catalyst for the production of a polyurethane from the polyol and the polyisocyanate.

Polymeric resins are incorporated as a significant component of the polymeric vehicle. In important embodiments of the invention the polymeric resins are polyunsaturated resins, and in significant embodiments they are polybutadienes. In general the polybutadienes may be prepared from cis or trans forms of 1,3-butadiene; the resulting products may contain cis double bonds, trans double bonds, or may contain molecules having mixtures of these forms. The molecular weights of the polybutadienes range from about 800 to about 2800. The polybutadiene may be used in a proportion ranging from about 9% to about 15%, where the percent is expressed as weight to weight.

Polyisocyanates that find important application in the embodiments of the invention include any polyfunctional organic isocyanate, including alkylene and arylene isocyanates. An important class of polyisocyanates are the diisocyanates such as isophorone diisocyanate (IPDI), 2,4- or 2,6-tolylene diisocyanate (TDI), propylene-1,2-diisocyanate, 1-propylene-1,2-diisocyanate, 2-propylene-1,2-diisocyanate, m-tetramethylxylene diisocyanate (TMXDI), naphthylene-1,4-diisocyanate, naphthylene-1,5-diisocyanate, and the like.

The polyols used advantageously in the invention include diols and higher polyols such as sugar alcohols. Important examples of polyols include ethylene glycol, propylene glycol, 1,4-butanediol, 1,6-hexanediol, glycerol, trimethylol propane, pentaerythritol, neopentyl glycol, sorbitol, and the like.

The unsaturated vegetable oils that find important application in the polymeric vehicles and the coating compositions of the present invention include a base oil that may be linseed oil, or another oil with properties equivalent to those of linseed oil, and mixtures thereof, and a blending oil such as tung oil, soya oil, and other oils having properties equivalent to those of tung oil or soya oil, and mixtures thereof.

The drier component used in the polymer vehicles and coating compositions of the invention include substances such as metallo-organic compounds, which may be derived from metal cations such as those of cobalt, calcium, zirconium, aluminum, manganese, or zinc, combined with organic moieties such as phenyl, tolyl, benzyl, naphthyl, lower alkyl groups of 1 to 20 carbon atoms, or cycloalkyl groups of 5 to 20 carbon atoms. Driers also include non-metallic organic compounds that may serve as catalysts in preparing the compositions of the invention.

The coatings produced upon curing of the coating compositions of the present invention are polyurethane based. The urethane-containing polymers arise upon chemical reaction between the hydroxyl groups of the polyol and the isocyanate groups of the polyisocyanate. When the polyol is a diol and the polyisocyanate is a diisocyanate, as is the case in important embodiments of the invention, the product is a polyurethane which is a linear polymer molecule.

The insolubility, and attendant impermeability, hardness, flexibility and clarity, of the coatings of the invention arise after curing of the composition. Without wishing to be bound by theory or hypothesis, it is believed that crosslinking between and among the oil and polyurethane components in the polymeric vehicle, and curing of the coating upon application to a surface results in the properties that ultimately confer protection to the surface upon which the coating is applied.

The choices of particular components to be employed in a polymeric vehicle or coating composition of the invention depends significantly on consideration of the overall objective of the invention, namely, minimization of the total content of VOCs, and on the interdependence between the various components which confers different properties on the coating ultimately obtained. Likewise the proportions of the components to be introduced into a polymeric vehicle or coating composition also varies, and depends on the properties of the components and their interdependence.

Polybutadiene polyols are employed in an important embodiment of the invention, and are generally low molecular weight linear polybutadiene preparations. The polybutadiene polyol will have a degree of polyfunctionality with respect to its hydroxyl groups that is effective to combine with at least two isocyanate groups of the polyisocyanate component. In an important embodiment of the invention, a diol obtained as an end-capped linear polybutadiene is employed. The molecular weight of the polybutadiene diol will be kept relatively low, and may have values ranging from about 1400 to about 2800. The polyol, or importantly the diol, may be used in a proportion ranging from about 9% to about 15%, where the percent is expressed as weight to weight. These may be obtained as liquid hydroxy terminated polybutadiene prepolymers, designated R45M, and PolyBD, sold by Arco Chemical Co., hydrogenated polybutadiene polyols avail from Mitsubishi Chemical Industries under the trade name "Polytail", and other similar products.

The polyisocyanate has a degree of polyfunctionality with respect to its isocyanate groups which is effective to combine with at least two pendant hydroxyl groups of the unsaturated polyol. In important embodiments of the invention the polyisocyanate is a diisocyanate, and is chosen from the group consisting of TDI, IPDI, TMXDI, propylene-1,2-diisocyanate, 1-propylene-1,2-diisocyanate, 2-propylene-1,2-diisocyanate, naphthylene-1,4-diisocyanate, naphthylene-1,5-diisocyanate, and mixtures thereof. The polyisocyanate, or importantly the diisocyanate, may be used in a proportion ranging from about 14% to about 20%, where the percent is expressed as weight to weight based on the coating composition.

The unsaturated vegetable oil employed in the polymeric vehicles and coating compositions of the invention may be chosen from any of a broad range of oils, including base oils that may be linseed oil, or a similar oil, and mixtures thereof, and a blending oil that may be tung oil, soya oil, or a similar oil, and mixtures thereof. The content of vegetable oil may range from about 58% to about 66% where the percent is expressed as weight to weight. In important embodiments of the invention the base oil is linseed oil and the blending oil is tung oil; the linseed oil is present at a proportion ranging from about 55% by weight to about 62% by weight, and the tung oil is present at a proportion ranging from about 4.0% by weight to about 7.0% by weight, based on the weight of the coating composition.

The drier component may be one or more cations chosen from among cobalt, calcium, zirconium, aluminum, manganese, and the like. The anions accompanying the cations used in the driers are organic anions. Advantageous driers used to achieve the objectives of the invention may be any one of cobalt salts of naphthenate, octoate, neodecanoate, phthalates, and the like; calcium salts of the same group of anions, zinc salts of the same group of anions, zirconium salts of the same group of anions, manganese salts of the same group of anions, and aluminum salts, or mixtures thereof. They include compounds of metals such as Al, Co, Mn, Ca, Zr, AOC 1020X (an aluminum composition containing 8.2% Al), compositions such as Dri-RX™ (2,2'-bipyridyl in propylene glycol ethers, OMG Americas, Inc., Cleveland, Ohio), Active 8™ (1,10-phenanthroline), and Cur-RX™ (vanadium 4%) and other commercial preparations which incorporate drier substances as their active principles. These driers and their combinations have varying activities and effectiveness. The amounts that are added to achieve curing of the compositions may range from about 0.01% to about 0.5% based on the content of the metal components in the drier compounds, where the percent is expressed as weight to weight.

Optional resins may be included in the formulations of the invention in order to optimize the properties of the working composition for application, and of the final coating.

Optional inclusion of an inert organic solvent in the coating composition is also envisioned. The solvent provides an operable coating composition for storage and shipping. Additional solvent may be added at the time of application according to specified limitations, in order to provide a coating composition that is workable and is readily spread on a surface, and yet remain within the intended limited VOC content.

Optionally additional components such as those that provide texture in the final coating, or that confer pigmentation, may also be included without affecting the advantages of the invention.

The polymeric vehicles of the instant invention are generally prepared by steps involving formation of the polyurethane based in a vegetable oil, and subsequently adding the resin in the blending oil. In order to prepare the polyurethane, a polyol in the base oil is heated to a high temperature in the presence of a catalyst in order to promote chemical interchanges between them. The catalyst may be, by way of non-limiting example, tin, calcium or lithium. Then a polyisocyanate, suspended in an inert solvent, is added at a slightly lower temperature. In a significant embodiment of the invention, the polyisocyanate is added in several stages rather than all at once. After quenching any remaining isocyanate groups, the polyurethane that results is a stable intermediate, provided as a chemically interchanged composition including the base oil. As such, it may be stored for subsequent formulation with the resin, or it may be shipped to a local supplier for local formulation with the resin. In either case, the resin is supplied suspended in the blending oil. The polymeric vehicle is prepared in a last step in which the polyurethane composition including the base oil is combined with the resin in the blending oil.

The coating compositions of the invention may be applied neat, directly as prepared according to the procedures above. Alternatively they may optionally be thinned with carefully limited amounts of an inert organic solvent prior to application. They may then be applied to a surface to produce varnish coatings upon curing. The surface may be either an interior surface or an exterior surface. For certain surfaces, such as concrete, pigments may be added to the polymeric vehicle to provide colored coatings. Additionally, for application on plastics, modifiers may be added to enhance the adhesion of the coating to the surface, and its hardness.

Application to the surface may proceed under a broad range of convenient atmospheric conditions while preserving the ability of the composition to cure to a coating having the favorable attributes that characterize the present invention. The ambient temperature may be in the range from about 55° F. to about 80° F., or importantly from about 70° F. to about 77° F. The ambient relative humidity may be in the range from about 10% to about 70%, or importantly from about 45% to about 55%. Under conditions such as these the coating compositions of the present invention cure to a hard coating within about 4.5 hr.

EXAMPLES

Example 1

Polymeric Vehicles

A large number of compositions having a VOC content of approximately 350 g/l was tested for satisfactory performance according to the objectives of the invention. The compositions listed in Table 1, which provides a partial list of their components, are among those that fulfilled the criteria.

TABLE 1

Coating Compositions*

| Formulation | Oil | % | Polyisocyanate, | % | Polyol, | % | Resin, | % |
|---|---|---|---|---|---|---|---|---|
| 170-0594/ | Linseed | 58.2 | TDI, | 17.2 | TMP, | 9.2 | PB, | 10.7 |
| (122-0649) | Tung | 4.6 | | | | | | |
| 158-0594 | Linseed | 60.7 | TDI, | 16.2 | TMP, | 8.7 | PB, | 10.0 |
| | Tung | 4.3 | | | | | | |
| 129-0649 | Sunflower | 52.5 | IPDI, | 19.45 | TMP, | 8.3 | PB, | 9.5 |
| | Tung | 10.1 | | | | | | |
| 149-0594 | Linseed | 60.5 | TDI, | 14.1 | TMP, | 8.6 | PB, | 14.36 |
| | Tung | 6.2 | | | | | PH, | 1.3 |
| 140-0594 | Linseed | 66.4 | TDI, | 18.0 | PE, | 11.5 | PA, | 4.1 |

*TDI, tolylene diisocyanate; IPDI, isophorone diisocyanate; PB, polybutadiene; PH, phenolic resin CK-2500 (G.P.); PE, pentaerythritol; PA, Phthalic Anhydride.

Reference Example 1

Commercial varnish preparations sold under the names Man O War™, Helmsman™ and Varathane 92 Clear Gloss Exterior Wood Finish were tested for their properties as coating compositions and as varnish coatings. Two samples of Varathane 92 were evaluated. The results are given in Table 2. The hardness determinations are also presented in FIG. 1. The results may be summarized as follows:

| Reference Sample | Conclusion |
|---|---|
| Man O War ™ | Acceptable hardness, viscosity and dry time |
| Helmsman ™ | Acceptable hardness and dry, however, heavy in viscosity |

| Reference Sample | Conclusion |
|---|---|
| Varathane Sample 1 | Acceptable dry and viscosity, however, heavy viscosity |
| Varathane Sample 2 | Acceptable hardness and dry, however, heavy in viscosity |

Example 2

Preparation of Composition 170-0594

The following components are used in preparing composition No. 170-0594:

| No. | Component | Parts by Volume |
|---|---|---|
| 1 | Linseed Oil | 1215.7 |
| 2 | Trimethylolpropane | 192.6 |
| 3 | DBTO (Fascat 4201) | 1.0 |
| 4 | Kwik Dry ™ 66 Mineral Spirits* | 224.7 |
| 5 | TDI | 89.8 |
| 6 | Kwik Dry ™ 66 Mineral Spirits | 224.7 |
| 7 | TDI | 89.8 |
| 8 | Kwik Dry ™ 66 Mineral Spirits | 224.7 |
| 9 | TDI | 89.8 |
| 10 | Kwik Dry ™ 66 Mineral Spirits | 224.7 |
| 11 | TDI | 89.8 |
| 12 | Kwik Dry ™ 66 Mineral Spirits | 224.7 |
| 13 | Methanol | 14.0 |
| 14 | Polybutadiene (Nuodex P-110) | 223.5 |
| 15 | Tung Oil (Raw) | 95.4 |
|  | Total | 3000.0 |

*Kwik Dry ™ is a trademark of Ashland Chemicals. It may be substituted with mineral spirits having a boiling point range of 310–360° F.

1. Charge a kettle with items 1, 2, and 3. Begin the flow of an inert gas.
2. Heat to 460° F. and hold for monoglyceride formation.
3. Once monoglyceride is obtained, cool to 360° F. and add item 4.
4. Cool to 170° F. and add items 5 and 6.
5. Stabilize the temperature at about 170° F. and add items 7 and 8. Repeat this step for items 9 and 10, and items 11 and 12.
6. Heat to 200–210° F. and hold until all isocyanate is reacted. This may be determined by monitoring with infrared spectroscopy. Maintain this temperature until the viscosity has a value of S to U (Gardner-Holdt).
7. Cool to 170° F. and add item 13 slowly and cautiously.
8. Add items 14 and 15.
9. Filter.

Example 3

Useful Varnish Coatings of the Invention

Coating compositions such as those having the compositions given in Table 1 were prepared, and various experimental driers and mixtures of driers were added to them. The resulting compositions, and the varnish coatings obtained from them, were tested for their usefulness according to a variety of properties. The results are provided in Table 3. The hardness determinations are also presented in FIG. 1. These results may be summarized as follows:

| Ref. Number | Drier Combination | Conclusion |
|---|---|---|
| 158-0594 | Co,AOC,Dri-RX | Fulfils the objectives |
| 149-0594 | Mn,A-8 | Fulfils the objectives |
| 170-0594 | Co,AOC or Zn, Dri-RX | Fulfils the objectives |
| 140-0594 | Co, Ca, Zr, E#2 | Marginal - Acceptable hardness, dry; heavy in viscosity |
| 140-0594 | Co, AOC, Dri-RX, E#2 | Marginal - Acceptable hardness, dry; heavy in viscosity. |

TABLE 2

Properties of Commercial Varnish Samples

| SAMPLE: | Man O War ™ | Helmsman ™ | Varathane 92(1) | Varathane 92(2) |
|---|---|---|---|---|
| Actual NVM: | 50.17% | 50.33% | 48.50% | 47.00% |
| Actual VOC: | | | | |
| (lbs/gallon): | 3.697 | 3.752 | 3.558 | 3.446 |
| (grams/liter): | 442.95 | 449.46 | 426.25 | 412.84 |
| Weight per gallon: | 7.42 | 7.455 | 7.336 | 7.332 |
| Gardner-Holdt Color: | 5+ | 12/13 cast | 14/15 | 9/10 |
| Flexibility (Conical): | Pass 1/8" | Pass 1/8" | Pass 1/8" | Pass 1/8" |
| Gardner-Holdt/#4 Ford Cup Viscosity Stability: | | | | |
| 1 day @ R.T.: | D+ (36) | H+ (60) | A (18) | G+ (54) |
| 7 days @ R.T.: | D+ | H+ | B− | F/G |
| Gardner-Holdt/Viscosity Stability: | | | | |
| Initial: | D+ | H+ | B− | F/G |
| 1 day @ 120° F.: | E | I+ | B− | F/G |
| 7 days @ 120° F.: | D/E (38) | H/I (61) | A+ (20) | E/F (44) |
| Sward Hardness: | | | | |
| 1 day: | 8 | 9 | 7 | 19 |
| 5 days: | 19 | 22 | 3 | 11 |
| 7 days: | 17 | 23 | 3 | 23 |
| 32/37/44 days: | −/31/− | −/25/− | 14/−/− | 42/−/− |

TABLE 2-continued

Properties of Commercial Varnish Samples

| SAMPLE: | Man O War ™ | Helmsman ™ | Varathane 92(1) | Varathane 92(2) |
|---|---|---|---|---|
| Skinning: | | | | |
| 1 day: | None | Slight | Slight | None |
| 10 days: | None | Slight | Slight | Slight |
| BYK-GARDNER LINEAR DRY RECORDER: | | | | |
| Dry/No Surface Trace: (hrs:min) | | | | |
| 1st Trial: | 4:55 | 3:05 | 3:45 | 3:25 |
| 2nd Trial: | | | 5:53 | 2:25 |

TABLE 3

Properties of Samples of Varnish Coatings

| SAMPLE NO.: | 158-0594 | 140-0594 | 140-0594 | 149-0594b | 170-0594 |
|---|---|---|---|---|---|
| Drier Combination: | Co, AOC, Dri-RX, E#2 | Co, Ca, Zr, E#2 | Co, AOC, Dri-RX, E#2 | Mn, A-8 | Co, AOC Dri-RX, E#2 |
| Actual NVM: | 60.49% | 60.74% | 61.11% | 61.34% | 61.24% |
| Actual VOC: | | | | | |
| (lbs/gallon) | 2.966 | 2.992 | 2.963 | 2.889 | 2.915 |
| (grams/liter): | 355.4 | 358.4 | 354.97 | 346.2 | 349.2 |
| Weight per gallon: | 7.508 | 7.62 | 7.619 | 7.475 | 7.52 |
| Gardner-Holdt Color: | ⅜ cast | ⅝ cast | ⅞ cast | ¾ | 6 cast |
| Flexibility (Conical): | Pass ⅛" | Pass ⅛" | Pass ⅛' | Pass ⅛" | Pass ⅛" |
| Gardner-Holdt/#4 Ford Cup Viscosity Stability: | | | | | |
| 1 day @ R.T.: | B+ (27) | J– | K– | A+ (20) | B/C (28) |
| 7 days @ R.T.: | C– | J | K– | B | D |
| Gardner-Holdt/Viscosity Stability: | | | | | |
| Initial: | C– | J | K– | B | D |
| 1 day @ 120° F.: | C– | J+ | K– | B | D |
| 7 days @ 120° F.: | C– (30) | I/J | K | B (25) | D (34) |
| Sward Hardness: | | | | | |
| 1 day: | 10 | 7 | 11 | 7 | 8 |
| 5 days: | 24 | 18 | 20 | 10 | 21 |
| 7 days: | 33 | 28 | 26 | 25 | 39 |
| 32/37/44 days: | -/-/40 | -/-/29 | -/-/29 | -/-/38 | -/-/53 |
| Skinning: | | | | | |
| 1 day: | Slight | None | Slight | None | Slight |
| 10 days: | Slight | None | Slight | None | Slight |
| K-GARDNER LINEAR DRY RECORDER: | | | | | |
| Dry/No Surface Trace: (hrs:min) | | | | | |
| 1st Trial: | 2:37 | 2:55 | 4:45 | 4:15 | 4:05 |
| 2nd Trial: | 3:10 | 2:35 | | 3:30 | |

Reference Example 2

Varathane coatings were tested for dry times through stages 3 and 4 using the BYK-Gardner Linear Dry Recorder. The results are shown in Table 4.

Example 4
Dry Times of Varnish Coatings of the Invention

Various compositions, some of which are set forth in Example 1, were prepared and blended with various drier combinations. They were subjected to drying tests in the BYK-Gardner Linear Dry Recorder. The results are presented in Table 4.

Reference Example 3.

Yellowing/Color Change: The preservation of clarity and resistance to coloring are given by the Yellowing Index. The films were applied at 3.0 wet mils using a bird bar. The substrate used was a Form 3B lacquered opacity chart from the Leneta Company. Color measurements were taken over the white sections of these charts with a BYK Gardner colorimeter using the Hunter L and b color scale. For each color determination an L (light-dark) value and a b (yellow-blue) value were obtained using a white color standard as a backer for the test panel. These color readings were converted to a yellowness index (Y.I.) according to ASTM E313 where Y.I.=142.9 b/L. The mathematical treatment provides a convenient single number for comparing color change. As a film yellows, the L value decreases (darker) and the b value increases (yellower) to give a higher Y.I. value. Initial Y.I. values were recorded after 7 days of dry time. The coated charts were aged in a dark cabinet for the number of days documented.

Figure 2:
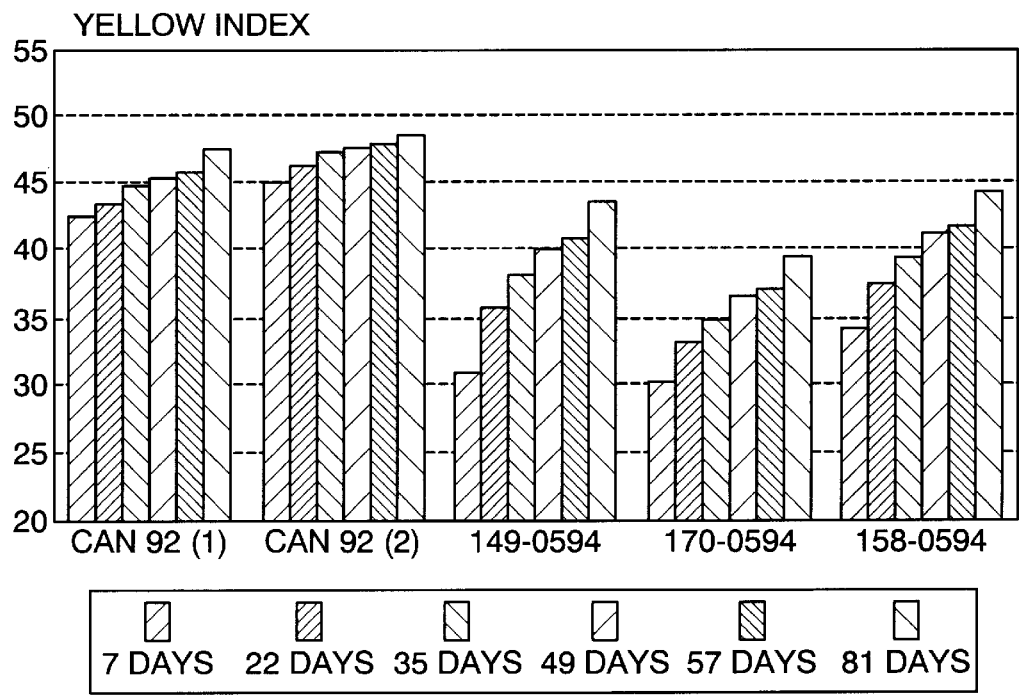
FIG. 2 presents the time course of development the yellowing index for two commercial varnish compositions and three coating compositions of the invention.
Figure 3:
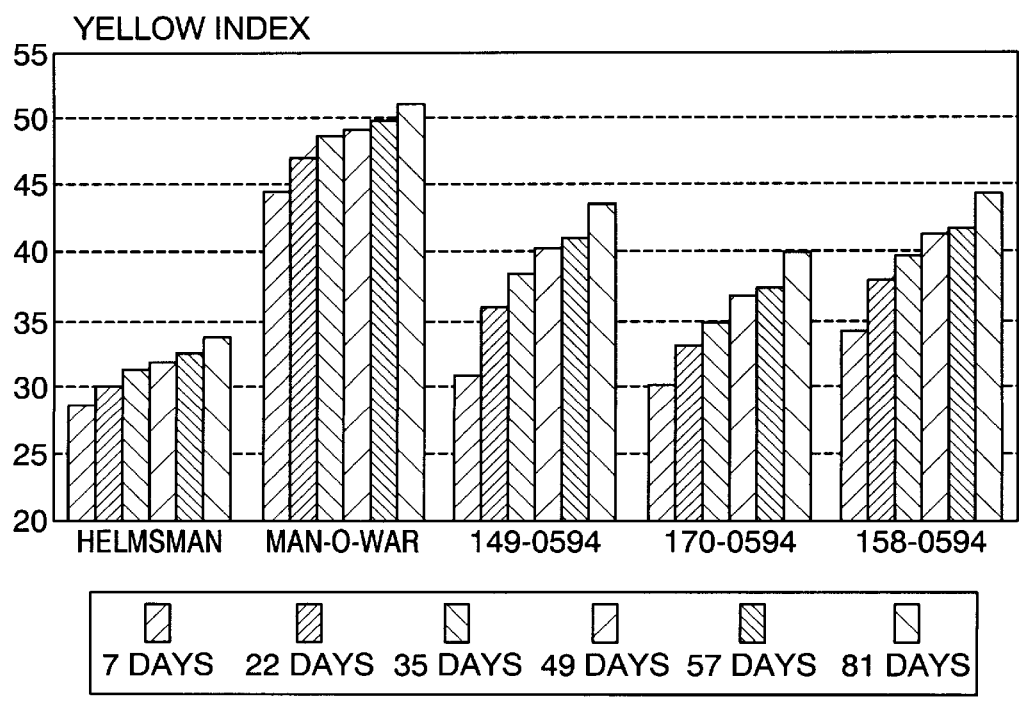
FIG. 3 presents the time course of development the yellowing index for two commercial varnish compositions and three coating compositions of the invention.

Results for Man O War™, Helmsman™ and Varathane 92 are given in FIGS. 2 and 3, with Varathane 92 (1) and Varathane 92 (2) (shown as Can 92 (1) and Can 92 (2), respectively, in the left palettes of FIG. 2), for times up to 81 days.

Example 5
Yellowing Index of Coating Compositions

The time course of change in the yellowing index, as defined and determined in Reference Example 3 is presented for three coatings deposited from coating compositions of the invention in the three right hand palettes in FIG. 2. These are repeated in FIG. 3.

Overall, after 81 days, the three coatings of the invention, 149-0594, 170-0594 and 158-0594 are less yellow than three of the four commercial varnishes. Helmsman is the only commercial varnish that retains a low value of the yellowing index.

Example 6
Dry Times of Coating Compositions

The dry times of two additional drier combinations, 191-0593A and 191-0593Z, of the invention were evaluated through all five drying stages. The compositions are shown below; 170-0594 is given in Example 1, Table 1.

TABLE 4

Dry Time Data from BYK-GARDNER Linear Dry Time Recorder

| Reference Number | Temperature (° F.) | Relative Humidity | Total Hours Through Given Stage | Type of Resin | *Drier Combination |
|---|---|---|---|---|---|
| Varathane 92(1) | 70 | 58 | 2 hours 45 min (3rd stage) | | |
| Varathane 92(2) | 70 | 58 | 3 hours 25 min (4th stage) | | |
| 136-0594 | 70 | 74 | 4 hours 15 min (3rd stage) | 134-0594 plus tung oil blended in | Mn, A-8 |
| 136-0594 | 70 | 58 | 6 hours 20 min (4th stage) | 134-0594 plus tung oil blended in | Co, Ca, Zr |
| 140-0594 | 70 | 74 | 6 hours 45 min (4th stage) | Linseed blended with C-82 (soya) | Mn, A-8 |
| 140-0594 | 72 | 62 | 2 hours 55 min (4th stage) | Linseed blended with C-82 (soya) | Co, Ca, Zr |
| 149-0594b | 70 | 56 | 4 hours 15 min (3rd stage) | Linseed Phenolic plus tung oil blended in | Mn, A-8 |
| 149-0594b | 70 | 56 | 6 hours 45 min (3rd stage) | Linseed Phenolic plus tung oil blended in | Co, Ca, Zr |
| 157-0594d | 71 | 70 | 3 hours 15 min (4th stage) | Linseed plus tung oil blended in | Co, Cur-RX, Dri-RX |
| 157-0594e | 71 | 70 | 2 hours 20 min (4th stage) | Linseed plus tung oil blended in | Co, AOC, Dri-RX |
| 157-0594f | 70 | 72 | 2 hours 37 min (4th stage) | Linseed plus tung oil blended in | Co, AOC, Dri-RX |
| 157-0594g | 70 | 80 | 3 hours 5 min (3rd stage) | Linseed plus tung oil blended in | Co, AOC, Dri-RX |

DRY TIME STAGES:

| | |
|---|---|
| First Stage - Leveling: | The film flows back together after the stylus moves through it. |
| Second Stage - Base Trace: | The film is starting to set up. It does not completely flow back together after the stylus moves through it. |
| Third Stage - Ripped Film: | The stylus rips the film. The film is starting to surface dry, but not through dry. |
| Fourth Stage - Surface Trace: | The stylus leaves a slight dark on the surface of the film. The film is starting to through dry. If a very, very slight stylus mark is in the film, this will be considered a mar. |
| Fifth Stage - Dry: | The stylus leaves no mark. |

*Cobalt 12%   Calcium 10%   Active-8 (A-8)
Zirconium 24%   Manganese 12%

AOC 1020X (8.2% Aluminum)
Dri-RX (Accelerator - 30%)
Cur-RX (Vanadium - 4%)

| Aluminum Drier Package (191-0593A) | Zinc Drier Package (191-0593Z) |
|---|---|
| 100.00 gm 170-0594 | 100.00 gm 170-0594 |
| .20 Co 12% | .20 Co 12% |
| 1.25 AOC 1020X | 1.25 Zn 8% |
| .20 DRI-Rx | .20 DRI-Rx |
| .10 SKINO #2 | .10 SKINO #2 |
| 16.00 Mineral Spirits | 16.00 Mineral Spirits |

(SKINO #2 is ethyl methyl ketoxime)
The results are presented in Table 5.

TABLE 5

Dry Times of Coating Compositions

| | 191-0593A | 191-0593Z |
|---|---|---|
| First Stage - Leveling | 10 min | 15 min |
| Second Stage - Basic Trace | 30 min | 15 min |
| Third Stage - Ripped Film | 60 min | 2 hrs 30 min |
| Fourth stage - Surface Trace | | 60 min 15 min |
| Fifth Stage - Dry | dry | dry |
| Total Hours: Minutes | 2:40 | 3:15 |

The 191-0593Z which uses the zinc drier package takes longer to dry than the 191-0593A which uses the aluminum drier package.

Example 7
Storage Stability of Coating Compositions

The stability against aging upon storage was tested by viscosity measurements on four commercial varnish compositions and three coating compositions of the invention. The stability was measured by the increase or decrease in viscosity. Gardner Holdt tubes were placed in an oven at 120° F. and the viscosity was monitored throughout 26 weeks. The results are given in Table 6.

TABLE 6

Stability of Varnish Coating Compositions on Aging

| | Initial Viscosity | After 26 Weeks @ 120° F. |
|---|---|---|
| Man O War ™ | D+ | D/E |
| Helmsman ™ | H+ | H/I Gel Particles |
| Varathane Sample 1 | B- | A |
| Varathane Sample 2 | F/G | D/E |
| 149-0594 | B | B+ |
| 170-0594 | D | E- |
| 158-0594 | C- | D+ |

Example 8
Resistance of Varnish Coatings to Abrasion

Resistance of the varnish coatings was assessed by the Taber abrasion test. The films were applied at 2.0 wet mils using a wire bar. The substrate used was a CAT. S-16 Steel panel from Taber Industries. The test used CS-10 wheels and 1000 gram weights. The panels air dried for 7 days prior to testing. The dry film thickness was approximately 1.0 to 1.2 dry mils. The data is presented in Table 7 as milligrams of coating lost which is the (initial weight of the panel)—(weight of panel after number of cycles).

TABLE 7

Resistance of Varnish Coatings to Abrasion

| | |
|---|---|
| Helmsman ™: | 100 Cycles - 11.60 mg loss/Broke through |
| Man O War ™: | 100 Cycles - 12.85 mg loss/Broke through |
| 191-0593A | (122-0649 with AOC drier package): |
| | 100 Cycles - 9.0 mg loss/No break through |
| | 250 Cycles - 27.6 mg loss/Broke through |
| 191-0593Z | (122-0649 with Zn drier package): |
| | 100 Cycles - 10.0 mg loss/No break through |
| | 250 Cycles - 25.4 mg loss/Broke through - very, very slight |
| 129-0649: | 100 Cycles - 9.5 mg loss/No break through |
| | 250 Cycles - 28.2 mg loss/Broke through |

These results suggest that the experimental varnishes 170-0594/122-0649 resin with aluminum and Zn drier packages (shown in Example 6) and 129-0649 (given in Example 1) exhibit better wear properties than the commercial varnishes.

We claim:

1. A polymeric vehicle effective for depositing a coating composition, curable upon exposure to the atmosphere and having a low content of a volatile organic component, a high content of nonvolatile materials, a low viscosity, and a short drying time,
    said polymeric vehicle comprising a polyurethane obtained by combining a polyisocyanate and a polyol, and further comprising a polyunsaturated resin, and an unsaturated vegetable oil,
    wherein said polyisocyanate has a degree of polyfunctionality effective to combine with at least two pendant hydroxyl groups of said polyol,
    wherein said polyol has a degree of polyfunctionality effective to combine with at least two isocyanate groups of said polyisocyanate.

2. The polymeric vehicle as recited in claim 1 wherein the polyisocyanate is selected from the group consisting of 2,4-tolylene diisocyanate, 2,6-tolylene diisocyanate (TDI), isophorone diisocyanate (IPDI), meta-tetramethylxylylene diisocyanate, m-tetramethylxylene diisocyanate (TMXDI), 1-propylene-1,2-diisocyanate, 2-propylene-1,2-diisocyanate, naphthylene-1,4-diisocyanate, naphthylene-1,5-diisocyanate, and mixtures thereof, and wherein said unsaturated vegetable oil is selected from the group consisting of linseed oil, tung oil, soya oil, walnut oil, safflower oil, sunflower oil, and mixtures thereof.

3. The polymeric vehicle as recited in claim 1 wherein said time required after application of the composition to dry to a hard coating is less than about 4.5 hrs.

4. The polymeric vehicle as recited in claim 1 wherein said polyisocyanate is present in a proportion ranging from about 14 weight % to about 20 weight % based on the weight of said coating composition.

5. The polymeric vehicle as recited in claim 1 wherein said polyunsaturated resin is polybutadiene.

6. The polymeric vehicle as recited in claim 2 wherein said polyisocyanate is TDI or IPDI.

7. The polymeric vehicle as recited in claim 2 wherein said unsaturated vegetable oil is a mixture of linseed oil and tung oil, said linseed oil being present at a proportion from about 55 weight % to about 62 weight %, and said tung oil being present at a proportion from about 4.0 weight % to about 7.0 weight % based on the weight of said coating composition.

8. The polymeric vehicle as recited in claim 2 wherein the polymeric vehicle further includes a dryer component and the dryer component is selected from the group consisting of cobalt compounds, calcium compounds, zinc compounds, zirconium compounds, aluminum compounds, manganese compounds, vanadium compounds, 1,10-phenanthroline, 2,2'-bipryidyl suspended in a suitable solvent, methyl ethyl ketoxime, and mixtures thereof.

9. The polymeric vehicle as recited in claim 1 wherein said polyunsaturated resin is present in a proportion ranging from about 9 weight % to about 15 weight % based on the weight of said coating composition.

10. The polymeric vehicle as recited in claim 1 wherein said polyunsaturated resin has a molecular weight of from about 800 to about 2800.

11. The polymeric vehicle as recited in claim 1 wherein after application on a surface and completion of curing said composition forms a varnish coating having high hardness and high flexibility, said coating maintaining a low yellowing index on aging.

12. A coating composition curable upon exposure to the atmosphere having a low content of a volatile organic component,
said coating composition comprising a polyurethane obtained by combining a polyisocyanate and a polyol, and further comprising a polyunsaturated resin, an unsaturated vegetable oil, and a drier component,
wherein said polyisocyanate has a degree of polyfunctionality effective to combine with at least two pendant hydroxyl groups of said polyol and the polyisocyanate is selected from the group consisting of tolylene diisocyanate and isophorone diisocyanate,
wherein said polyol has a degree of polyfunctionality effective to combine with at least two isocyanate groups of said polyisocyanate,
wherein said unsaturated vegetable oil is chosen from the group consisting of linseed oil, tung oil, soya oil, walnut oil, safflower oil, sunflower oil, and mixtures thereof,
wherein said drier component is chosen from the group consisting of cobalt compounds, calcium compounds, zinc compounds, zirconium compounds, aluminum compounds, manganese compounds, vanadium compounds, 1,10-phenanthroline, 2,2'-bipryidyl suspended in a suitable solvent, methyl ethyl ketoxime, and mixtures thereof.

13. The curable coating composition as recited in claim 12 wherein the content of said volatile organic component is greater than about 300 g/l and less than about 360 g/l.

14. The curable coating composition as recited in claim 12 wherein the content of said volatile organic component is greater than about 340 g/l and less than about 360 g/l.

15. The curable coating composition as recited in claim 12 wherein the time required after application of the composition to dry to a coating on which a stylus leaves a slight mark is less than about 3.5 hrs.

16. The curable coating composition as recited in claim 12 wherein said time required after application of the composition to dry to a hard coating is less than about 4.5 hrs.

17. The curable coating composition as recited in claim 12 wherein said polyisocyanate is present in a proportion ranging from about 14 weight % to about 20 weight % based on the weight of the coating composition.

18. The curable coating composition as recited in claim 12 wherein said polyunsaturated resin is polybutadiene.

19. The curable coating composition as recited in claim 12 wherein said unsaturated vegetable oil is a mixture of linseed oil and tung oil, said linseed oil being present at a proportion ranging from about 55 weight % to about 62 weight %, and said tung oil being present at a proportion ranging from about 4.0 weight % to about 7.0 weight % based on the weight of the coating composition.

20. The curable coating composition as recited in claim 12 wherein said dryer component is chosen from the group consisting of (a) a mixture of a cobalt compound, an aluminum compound, 2,2'-bipyridyl suspended in a suitable solvent, and ethyl methyl ketoxime, and (b) a mixture of a cobalt compound, a zinc compound, 2,2'-bipyridyl suspended in a suitable solvent, and ethyl methyl ketoxime.

21. The curable coating composition as recited in claim 12 wherein said polyunsaturated resin is present in a proportion ranging from about 9 weight % to about 15 weight % based on the weight of said coating composition.

22. The curable coating composition as recited in claim 12 wherein said polyunsaturated resin has a molecular weight of from about 800 to about 2800.

23. The curable coating composition as recited in claim 12 wherein said viscosity when determined at the time said composition is applied on a surface ranges from about A to about D using the Gardner-Holdt scale.

24. The curable coating composition as recited in claim 12 wherein after application on a surface and completion of curing the composition forms a varnish coating having high hardness and high flexibility, said coating maintaining a low yellowing index on aging.

25. The polymeric vehicle as recited in claim 8 wherein said dryer component is chosen from the group consisting of (a) a mixture of a cobalt compound, an aluminum compound, 2,2'-bipyridyl suspended in a suitable solvent, and ethyl methyl ketoxime, and (b) a mixture of a cobalt compound, a zinc compound, 2,2'-bipyridyl suspended in a suitable solvent, and ethyl methyl ketoxime.

* * * * *